(12) United States Patent
Stranberg

(10) Patent No.: US 11,958,245 B2
(45) Date of Patent: *Apr. 16, 2024

(54) SYSTEM FOR ADDITIVELY MANUFACTURING COMPOSITE STRUCTURE

(71) Applicant: Continuous Composites Inc., Coeur d'Alene, ID (US)

(72) Inventor: Nathan Andrew Stranberg, Post Falls, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 71 days.

This patent is subject to a terminal disclaimer.

(21) Appl. No.: 17/654,090

(22) Filed: Mar. 9, 2022

(65) Prior Publication Data

US 2022/0194012 A1 Jun. 23, 2022

Related U.S. Application Data

(63) Continuation of application No. 16/842,420, filed on Apr. 7, 2020, now Pat. No. 11,312,083.

(Continued)

(51) Int. Cl.
*B29C 64/209* (2017.01)
*B22F 10/10* (2021.01)
(Continued)

(52) U.S. Cl.
CPC ............ *B29C 64/209* (2017.08); *B22F 10/10* (2021.01); *B22F 10/18* (2021.01); *B22F 12/53* (2021.01);

(Continued)

(58) Field of Classification Search
CPC ... B29C 64/393; B29C 64/209; B29C 64/241; B29C 64/106; B29C 64/218;
(Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Nahida Sultana
(74) *Attorney, Agent, or Firm* — Ryan Stockett

(57) ABSTRACT

A system is disclosed that includes an end effector and a support configured to move the end effector. The support may include a first link, a second link rotationally connected to the first link at a joint, and a motor rigidly mounted to the first link and configured to drive rotation of the second link relative to the first link. The support may also include a sole encoder associated with the joint and configured to generate a signal indicative of a position of the first link relative to the second link. The system may further include a controller in communication with the sole encoder and the motor. The controller may be configured to selectively trim operation of the motor based only on the signal.

20 Claims, 2 Drawing Sheets

Related U.S. Application Data

(60) Provisional application No. 62/853,610, filed on May 28, 2019.

(51) Int. Cl.
| | |
|---|---|
| *B22F 10/18* | (2021.01) |
| *B22F 10/50* | (2021.01) |
| *B22F 10/80* | (2021.01) |
| *B22F 12/00* | (2021.01) |
| *B22F 12/41* | (2021.01) |
| *B22F 12/53* | (2021.01) |
| *B22F 12/63* | (2021.01) |
| *B29C 64/106* | (2017.01) |
| *B29C 64/218* | (2017.01) |
| *B29C 64/227* | (2017.01) |
| *B29C 64/232* | (2017.01) |
| *B29C 64/236* | (2017.01) |
| *B29C 64/241* | (2017.01) |
| *B29C 64/379* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B29C 64/165* | (2017.01) |

(52) U.S. Cl.
CPC ............ *B22F 12/63* (2021.01); *B29C 64/106* (2017.08); *B29C 64/218* (2017.08); *B29C 64/241* (2017.08); *B29C 64/393* (2017.08); *B33Y 10/00* (2014.12); *B33Y 30/00* (2014.12); *B33Y 50/02* (2014.12); *B22F 10/50* (2021.01); *B22F 10/80* (2021.01); *B22F 12/22* (2021.01); *B22F 12/41* (2021.01); *B29C 64/165* (2017.08); *B29C 64/227* (2017.08); *B29C 64/232* (2017.08); *B29C 64/236* (2017.08); *B29C 64/379* (2017.08)

(58) Field of Classification Search
CPC ... B29C 64/227; B29C 64/232; B29C 64/236; B29C 64/379; B33Y 10/00; B33Y 30/00; B33Y 50/02; B22F 10/00
USPC .......................................... 264/308; 425/375
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 8,989,898 B2* | 3/2015 | DeVlieg | B25J 13/088 318/560 |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,511,543 B2 | 12/2016 | Tyler | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,647,058 B2 | 5/2020 | Tyler et al. | |
| 10,725,421 B2* | 7/2020 | Saitou | G03G 21/1619 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0037022 A1* | 2/2009 | Teaford | B25J 9/1641 901/30 |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0089254 A1* | 4/2012 | Shafer | B25J 9/1641 901/46 |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2014/0328963 A1 | 11/2014 | Mark et al. | |
| 2015/0136455 A1 | 5/2015 | Fleming | |
| 2015/0217517 A1 | 8/2015 | Karpas et al. | |
| 2015/0273762 A1 | 10/2015 | Okamoto | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |

(56) References Cited

U.S. PATENT DOCUMENTS

| | | |
|---|---|---|
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0101286 A1 | 4/2017 | Brockman et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sautl et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0126652 A1 | 5/2018 | Mansson et al. |
| 2019/0022935 A1 | 1/2019 | Tooren et al. |
| 2019/0375154 A1 | 12/2019 | Hambling et al. |

FOREIGN PATENT DOCUMENTS

| | | |
|---|---|---|
| EP | 2433784 B1 | 6/2017 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Jul. 6, 2021 for PCT/US2021/019533 to Continuous Composites Inc. filed on Feb. 25, 2021.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

(56) References Cited

OTHER PUBLICATIONS

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-FiberCured Layer by Layer, Journal of Applied Polymer Science, vol. 123, Issue 6, pp. 3799-3805.

* cited by examiner

SYSTEM FOR ADDITIVELY MANUFACTURING COMPOSITE STRUCTURE

RELATED APPLICATION

This application is a continuation of U.S. Non-Provisional application Ser. No. 16/842,420 that was filed on Apr. 7, 2020, which is based on and claims the benefit of priority from U.S. Provisional Application No. 62/853,610 that was filed on May 28, 2019, the contents of all of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Placement accuracy in the material discharged from an additive manufacturing print head can be important. In some additive manufacturing systems, the print head is mounted to the end of a robotic arm, allowing for larger structures to be fabricated within the overall reach of the arm. Typical robot arms, however, can produce inaccurate movements due to gaps between moving components (a.k.a., static lash associated with gears) and/or due to flexing of components at higher speeds (a.k.a., dynamic lash associated with bending of the arm).

It is known to enhance movement accuracy of a robotic arm by way of a secondary feedback system. One example is disclosed in U.S. Pat. No. 8,989,898, which issued on Mar. 24, 2015 and is assigned to Electroimpact, Inc. ("the '898 patent"). In particular, the '898 patent discloses a robotic arm having more than three cascaded rotary axes, an internal primary encoder-integrated motor associated with each of the axes, and an external secondary rotary encoder that directly reads the rotary position of each of the axes. A controller uses the internal primary encoders to generate feedforward signals to the motors, and then uses the feedback information from the secondary rotary encoders to make adjustments to the motors and accurately position an end tool to specified 3-dimensional linear cartesian coordinates.

Although the '898 patent may provide for enhanced movement accuracy of a robotic arm, the benefits associated therewith may be limited. For example, the system of the '898 patent may not be applicable to robotic arms with three or fewer rotary axes or with rotary axes that are not cascaded. Further, because the system of the '898 utilizes secondary encoders to correct information already obtained from primary encoders, the system may be duplicitous, complicated, and expensive. The disclosed additive manufacturing system addresses these and other issues of the prior art. The disclosed additive manufacturing system is uniquely configured to provide these improvements and/or to address other issues of the prior art.

SUMMARY

In one aspect, the present disclosure is directed to an additive manufacturing system. The additive manufacturing system may include a print head, and a support configured to move the print head. The support may include a first link, a second link rotationally connected to the first link at a joint, and an encoder-less motor rigidly mounted to the first link and configured to drive rotation of the second link relative to the first link. The support system may also include a sole encoder associated with the joint and configured to generate a signal indicative of an angular position of the first link relative to the second link. The additive manufacturing system may further include a controller in communication with the sole encoder and the encoder-less motor. The controller may be configured to selectively trim operation of the encoder-less motor based only on the signal.

In another aspect, the present disclosure is directed to another additive manufacturing system. This additive manufacturing system may include a print head, and a support configured to move the print head. The support may include a first link, a second link rotationally connected to the first link at a joint, and an encoder-less motor rigidly mounted to the first link and configured to drive rotation of the second link relative to the first link. The support may also include a transmission operatively positioned between an output of the encoder-less motor and the second link. The transmission may be configured to adjust a speed-to-torque ratio of power transmitted from the encoder-less motor to the second link. The support may further include a sole encoder associated with the joint and configured to generate a signal indicative of an angular position of the first link relative to the second link. The additive manufacturing system may also include a controller in communication with the sole encoder and the encoder-less motor and have a map stored in memory relating a current profile for the encoder-less motor to a desired motion of the support. The controller may be configured to direct the current profile to the encoder-less motor based on a predetermined discharge path of material from the print head, and to trim the current profile based only on the signal In yet another aspect, the present disclosure is directed to a method of additively manufacturing a structure. The method may include discharging from a print head a material, and rotating a first link of a joint relative to a second link with an encoder-less motor to move the print head along a predetermined path during discharging. The method may also include generating a signal indicative of rotation of the first link relative to the second link with a sole encoder associated with the joint, and selectively trimming operation of the encoder-less motor based only on the signal.

DETAILED DESCRIPTION

Figure 1:
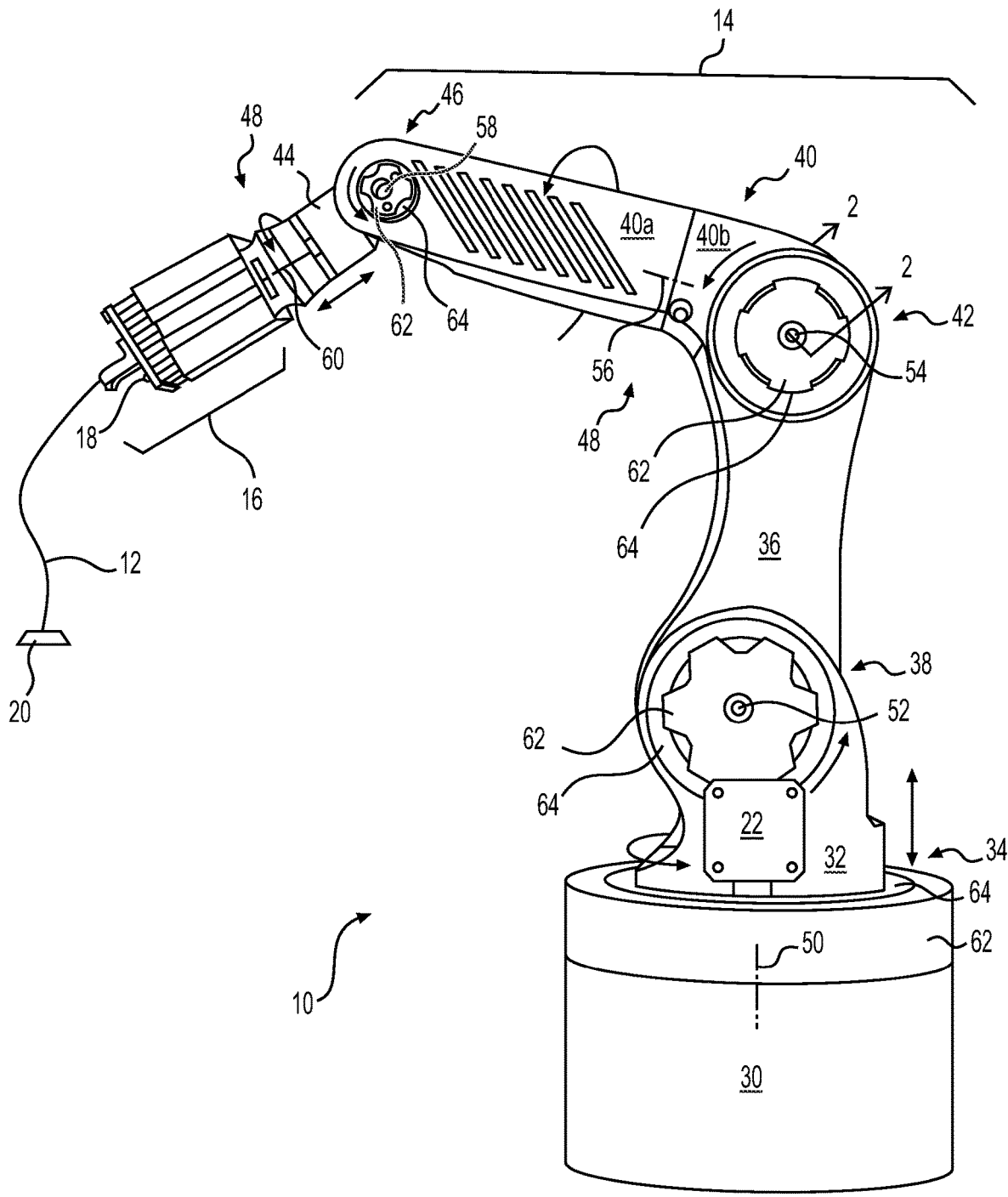
FIG. 1 is a diagrammatic illustration of an exemplary disclosed additive manufacturing system.

FIG. 1 illustrates an exemplary system 10, which may be used to manufacture a composite structure 12 having any desired shape. System 10 may include a support 14 and deposition head ("head") 16. Head 16 may be coupled to and moved by support 14.

Figure 2:
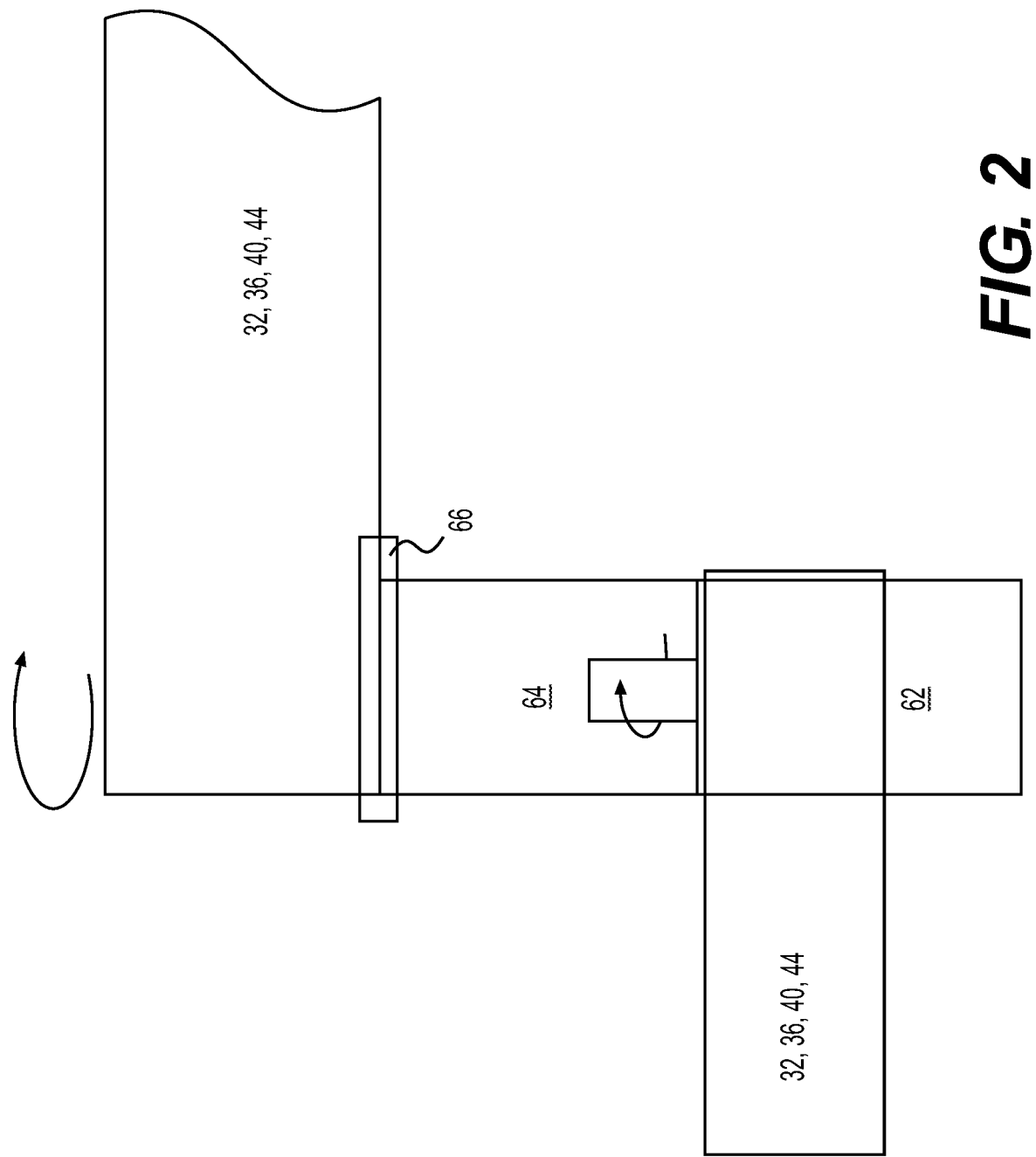
FIG. 2 is diagrammatic illustration of an exemplary disclosed support that may be used in conjunction with the system of FIG. 1.

In the disclosed embodiment of FIGS. 1 and 2, support 14 is a robotic arm. As a robotic arm, support 14 may include a base 30 and any number of links operatively connected to base 30. Base 30 may be stationary (shown as a fixed pedestal in FIG. 1) or moveable (e.g., mounted to a crawling undercarriage, a sliding rail, and/or a gantry system—not shown). In the disclosed embodiment, multiple links are cascadingly connected to base 30. For example, a first link 32 may be connected to base 30 at a waist joint 34; a second link 36 may be connected to first link 32 at a shoulder joint 38; a third link 40 may be connected to second link 36 at an elbow joint 42; and head 16 may be connected to third link 40 at a wrist joint 46. In some embodiments, link 40 may be separated into first and second axially aligned parts 40a, 40b that rotate relative to each other about their common axis at an auxiliary joint 48. Similarly, an additional joint 48 may be located between head 16 and wrist joint 46, if desired.

Link 32 may be configured to rotate about a first (e.g., a vertical) axis 50 of waist joint 34. Link 36 may be configured to rotate about a second (e.g., a horizontal) axis 52 of shoulder joint 38 that is generally orthogonal to first axis 50. Link 40 may be configured to rotate about a third (e.g., a horizontal) axis 54 of elbow joint 42 that is generally parallel with second axis 52. Link part 40a may rotate relative to link part 40b about a fourth axis 56 that is generally perpendicular to both axis 52 and axis 54. Head 16 may be configured to rotate about a fifth axis 58 of wrist joint 46 and also about a sixth axis 60 of joint 48. Axis 58 may be generally parallel with axes 52 and 54, while axis 60 may be generally orthogonal to axis 58 and axis 50.

One or more motors 62 may be situated to selectively effect each of the above-described rotations in response to commands generated by a controller 22. For example, at least one motor 62 may be associated with each of joints 34, 38, 40, 42, 46, 48, rigidly mounted to one member of the joint, and operatively mounted to the other member of the joint. For instance, a first motor 62 may be rigidly mounted to base 30 and operatively mounted to a base end of link 32. A second motor 62 may be rigidly mounted to a distal end of link 32 and operatively mounted to a base end of link 36. A third motor 62 may be rigidly mounted to a distal end of link 36 and operatively mounted to a base end of link 40. A fourth motor 62 may be rigidly mounted to a distal end of link 40 and operatively mounted to a base end of head 16. Additional motors could be similarly disposed between parts 40a and 40b of link 40 and/or associated with the components of joint 48.

It should be noted that the particular arrangement of links, joints, axes, and motors depicted in FIG. 1 and discussed herein is exemplary only. Other configurations having a different number, types, and/or configurations of links, joints, axes, and motors are contemplated.

One or more of motors 62 may be an "encoder-less" motor. That is, motor 62 may consist generally of a housing, stator (e.g., one or more magnets) disposed inside of the housing, a rotor (e.g., a wire coil wrapped around an axle) inserted into the stator, and a commutator (e.g., a divided ring of an electrical circuit) positioned at one end of the rotor. As current is directed through the commutator to the coil of the rotor, a dynamic magnetic field is generated that pushes against a static field created by the magnets of the stator, causing the axle to rotate. The commutator reverses the electrical current passing to the coil each time the coil rotates half of a turn. An encoder-integrated motor includes an extra component (e.g., mounted inside the housing) to turn rotation of the rotor into an outbound signal, which can be used to control speed, angle, torque, acceleration and/or another operating parameter of the motor. An encoder-less motor does not include this extra component and is therefore less complicated, bulky, heavy, failure-prone, difficult to maintain, and expensive.

As shown in FIG. 2, one or more of motors 62 may be connected to the associated link(s) (32, 36, 40, 44) via a transmission 64. Transmission 64 may include any number and type of gears, pumps, motors, pulleys, belts, clutches, shafts, and/or other mechanical interfaces having features (e.g., gear teeth, splines, cogs, etc.) that are intermeshed or otherwise engaged with each other to transmit rotations between motor 62 and the associated link(s) at specific or variable ratios of speed-to-torque. In some embodiments, transmission 64 is known as a gear box, speed reducer, or final drive and configured to receive a rotational input at a first speed and torque and provide a rotational output at a different (e.g., lower) speed and different (e.g., higher) torque.

Clearances known as lash are purposely built in between the features of the transmission interfaces to allow relative movement between the components without binding. In addition, these clearances allow for lubrication between the components that inhibits overheating and/or excessive wear of the components. Unless the lash is otherwise accounted for, the motion of the links, and consequently of print head 16, may be inaccurate and/or imprecise.

In the disclosed embodiment, a single encoder is utilized at a given joint location. For example, as shown in FIG. 2, an external and stand-alone (e.g., not integrated into another component) encoder 66 may be selectively placed at one or more of the joints. Encoder 66 may be configured to generate one or more signals indicative of an actual rotation of the associated joint (e.g., of the base end of the operatively connected link relative to the proximal end of the rigidly connected link). Encoder 66 may be placed at a location downstream of where lash occurs (e.g. relative to a flow of power from motor 62 through transmission 64 to the joint), such that the signal is unaffected by the lash.

Encoder 66 may generally include an indexing component affixed to rotate with one link end of a particular joint, and a sensing component affixed to rotate with a remaining link end of the particular joint. As the indexing component rotates relative to the sensing component, the sensing component may generate one or more signals indicative of the relative rotation. Any type of indexing and/or sensing components (e.g., optical, magnetic, mechanical, acoustic, etc.) may be used for this purpose. The signals may be directed to controller 22 (referring to FIG. 1), and controller 22 may then utilize the signals, alone, as feedback for controlling the position, torque, and/or speed of motor 62.

Returning to FIG. 1, head 16 may be configured to receive or otherwise contain a matrix. The matrix may include any types or combinations of materials (e.g., a liquid resin, such as a zero-volatile organic compound resin, a powdered metal, etc.) that are curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized (e.g., positively and/or negatively), for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements. In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to at least partially coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic fibers, optical fibers (e.g., tubes), etc. It should be noted that the term "reinforcement" is meant to encompass both structural and non-structural (e.g., functional) types of continuous materials that are at least partially encased in the matrix discharging from head 16.

The reinforcements may be at least partially coated with the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, nano particles or tubes, etc.) and/or additives (e.g., thermal initiators, UV initiators, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, solidify the matrix, polymerize the matrix, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is at least partially (e.g., completely) cured before the axial growth length becomes equal to an external diameter of the matrix-coated reinforcement.

The matrix and/or reinforcement may be discharged together from head 16 via any number of different modes of operation. In a first example mode of operation, the matrix and/or reinforcement are extruded (e.g., pushed under pressure and/or mechanical force) from head 16 as head 16 is moved by support 14 to create features of structure 12. In a second example mode of operation, at least the reinforcement is pulled from head 16, such that a tensile stress is created in the reinforcement during discharge. In this second mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point (e.g., a print bed, an existing surface of structure 12, a fixture, etc.) 20. For example, at the start of structure formation, a length of matrix-impregnated reinforcement may be pulled and/or pushed from head 16, deposited onto anchor point 20, and at least partially cured, such that the discharged material adheres (or is otherwise coupled) to anchor point 20. Thereafter, head 16 may be moved away from anchor point 20, and the relative movement may cause the reinforcement to be pulled from head 16. As will be explained in more detail below, the movement of reinforcement through head 16 may be selectively assisted via one or more internal feed mechanisms, if desired. However, the discharge rate of reinforcement from head 16 may primarily be the result of relative movement between head 16 and anchor point 20, such that tension is created within the reinforcement. As discussed above, anchor point 20 could be moved away from head 16 instead of or in addition to head 16 being moved away from anchor point 20.

As discussed above, one or more controllers 22 may be provided and communicatively coupled with support 14 and head 16. Each controller 22 may embody a single processor or multiple processors that are programmed and/or otherwise configured to control an operation of system 10. Controller 22 may include one or more general or special purpose processors or microprocessors. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored within the memory of controller 22 and used during fabrication of structure 12. Each of these maps may include a collection of data in the form of lookup tables, graphs, and/or equations. In the disclosed embodiment, the maps may be used by controller 22 to determine movements of head 16 required to produce desired geometry (e.g., size, shape, material composition, performance parameters, and/or contour) of structure 12, and to regulate operation of cure enhancer(s) 18, motors 62, and/or other related components in coordination with the movements and/or based on signals from one or more of encoders 66.

INDUSTRIAL APPLICABILITY

The disclosed system may be used to manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectories, surface normal, etc.), surface features (e.g., ridge size, location, thickness, length; flange size, location, thickness, length; etc.), connection geometry (e.g., locations and sizes of couplings, tees, splices, etc.), reinforcement selection, matrix selection, discharge locations, severing locations, operating parameters of motors 62, operating parameters of encoders 66, etc. It should be noted that this information may alternatively or additionally be loaded into system 10 at different times and/or continuously during the manufacturing event, if desired.

The information loaded into controller 22 may be used to regulate operations of system 10. For example, the reinforcement may pass into head 16, be wetted with the matrix, and discharged against anchor point 20. Thereafter, controller 22 may selectively activate motors 62 to cause desired movements of head 16 away from anchor point 20 that results in the reinforcement being pulled from head 16 and cured along a desired trajectory.

The desired movements of head 16 may be achieved by activating select motors 62 at appropriate timings and with appropriate accelerations, speeds, and/or torques. In one embodiment, controller 22 may selectively direct current to one or more motors 62 in an open-loop manner based on the maps stored in memory. For example, based on a desired acceleration, speed, timing, movement distance, discharge path, and known loading conditions and kinematics of system 10, controller 22 may reference the map stored in memory and retrieve or otherwise determine one or more current profiles that should be directed to one or more of motors 62. The current profile may include, among other things, timings at which currents should be applied, amplitudes, and/or durations.

Controller 22 may selectively implement the current profile(s), and receive the signals generated by encoder(s) 66 during the implementation. Controller 22 may selectively trim (e.g., increase and/or decrease current amplitude, current duration, and/or timings of) the current profiles based on the signals. For example, as the signals indicate that the actual relative rotations of joints 34, 38, 40, 42, 46, and/or 48 are deviating from desired relative rotations that correspond with the specified discharge path of the matrix-wetted reinforcement, controller 22 may adjust (adjust current amplitude, adjust current duration, adjust application timings, etc. of) the current profile.

The operating parameters of support 14, cure enhancer(s) 18, and/or other components of system 10 may be adjusted in real time during material discharge to provide for desired bonding, strength, tension, geometry, and other characteristics of structure 12. Once structure 12 has grown to a desired length, structure 12 may be severed from system 10.

It will be apparent to those skilled in the art that various modifications and variations can be made to the disclosed system. Other embodiments will be apparent to those skilled in the art from consideration of the specification and practice of the disclosed system. For example, it is contemplated that transmission 64 could be omitted, if desired. It is intended that the specification and examples be considered as exemplary only, with a true scope being indicated by the following claims and their equivalents.

What is claimed is:

1. A system, comprising:
   an end effector;
   a support configured to move the end effector, the support having:
      a first link;
      a second link rotationally connected to the first link at a joint;
      a motor rigidly mounted to the first link and configured to drive rotation of the second link relative to the first link; and
      a sole encoder associated with the joint and configured to generate a signal indicative of a position of the first link relative to the second link; and
   a controller in communication with the sole encoder and the motor, the controller being configured to selectively trim operation of the motor based only on the signal.

2. The system of claim 1, wherein:
   the controller includes a map stored in a memory relating a current profile for the motor to a desired motion of the support; and
   the controller is configured to direct the current profile to the motor based on a predetermined discharge path of a material from the end effector.

3. The system of claim 2, wherein the controller is configured to selectively trim operation of the motor by trimming the current profile based on only the signal.

4. The system of claim 3, wherein the controller is configured to selectively trim operation of the motor by selectively adjusting at least one of a current amplitude, a current duration, and a timing of current application.

5. The system of claim 1, wherein the sole encoder is a stand-alone encoder.

6. The system of claim 1, wherein the sole encoder includes:
   an indexing element affixed to rotate with the first link; and
   a sensing element affixed to rotate with the second link and configured to generate the signal based on detected motion of the indexing element.

7. The system of claim 1, further including a transmission operatively positioned between an output of the motor and the second link, the transmission being configured to adjust a speed-to-torque ratio of power transmitted from the motor to the second link.

8. The system of claim 7, wherein:
at least one of the motor and the transmission includes lash; and
the sole encoder is located downstream of a location at which the lash occurs relative to a flow of power from the motor through the transmission.

9. The system of claim 7, wherein:
at least one of the motor and the transmission includes lash; and
the signal generated by the sole encoder is unaffected by the lash.

10. A system, comprising:
an end effector;
a support configured to move the end effector, the support having:
 a first link;
 a second link rotationally connected to the first link at a joint;
 a motor rigidly mounted to the first link and configured to drive rotation of the second link relative to the first link;
 a transmission operatively positioned between an output of the motor and the second link, the transmission being configured to adjust a speed-to-torque ratio of power transmitted from the motor to the second link; and
 a sole encoder associated with the joint and configured to generate a signal indicative of an angular position of the first link relative to the second link; and
a controller in communication with the sole encoder and the motor and having a map stored in a memory relating a current profile for the motor to a desired motion of the support, the controller being configured to:
direct the current profile to the motor based on a predetermined discharge path of a material from the end effector; and
trim the current profile based only on the signal.

11. The system of claim 10, wherein the controller is configured to trim operation of the motor by selectively adjusting at least one of a current amplitude, a current duration, and a timing of current application.

12. The system of claim 10, wherein the sole encoder is a stand-alone encoder.

13. The system of claim 10, wherein the sole encoder includes:
an indexing element affixed to rotate with the first link; and
a sensing element affixed to rotate with the second link and configured to generate the signal based on detected motion of the indexing element.

14. The system of claim 10, wherein:
at least one of the motor and the transmission includes lash; and
the sole encoder is located downstream of a location at which the lash occurs relative to a flow of power from the motor through the transmission.

15. The system of claim 10, wherein:
at least one of the motor and the transmission includes lash; and
the signal generated by the sole encoder is unaffected by the lash.

16. A method of operating a system, comprising:
activating an end effector;
rotating a first link of a joint relative to a second link with a motor to move the end effector along a predetermined path during discharging;
generating a signal indicative of rotation of the first link relative to the second link with a sole encoder associated with the joint; and
selectively trimming operation of the motor based only on the signal.

17. The method of claim 16, further including:
referencing a map stored in a memory to determine a current profile for the motor related to the predetermined path; and
directing the current profile to the motor during discharging.

18. The method of claim 17, wherein selectively trimming operation of the motor includes trimming operation of the motor by trimming the current profile based on only the signal.

19. The method of claim 18, wherein trimming the current profile includes selectively adjusting at least one of a current amplitude, a current duration, and a timing of current application.

20. The method of claim 16, wherein:
rotating a first link of a joint relative to a second link with a motor includes directing power from the motor through a transmission operatively positioned between an output of the motor and the second link, the transmission being configured to adjust a speed-to-torque ratio of power transmitted from the motor to the second link;
at least one of the motor and the transmission includes lash; and
the signal is unaffected by the lash.

* * * * *